US008537507B2

(12) United States Patent
Anand et al.

(10) Patent No.: US 8,537,507 B2
(45) Date of Patent: Sep. 17, 2013

(54) MEMS-BASED SWITCHING SYSTEMS

(75) Inventors: Pradeep Kumar Anand, Bangalore (IN); John Kenneth Hooker, Louisville, KY (US); Remesh Kumar Keeramthode, Secunderabad (IN); Brent Charles Kumfer, Farmington, CT (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 12/940,027

(22) Filed: Nov. 4, 2010

(65) Prior Publication Data

US 2012/0113550 A1 May 10, 2012

(51) Int. Cl.

| | |
|---|---|
| ***H02H 3/00*** | (2006.01) |
| ***H02H 7/00*** | (2006.01) |
| ***H01H 9/30*** | (2006.01) |
| ***H01H 9/56*** | (2006.01) |
| ***H01H 73/18*** | (2006.01) |

(52) U.S. Cl.
USPC .................................................. 361/13; 361/8

(58) Field of Classification Search
USPC .................................................... 361/2, 8, 13
See application file for complete search history.

(56) References Cited

U.S. PATENT DOCUMENTS

| | | | | |
|---|---|---|---|---|
| 4,723,187 | A | 2/1988 | Howell | |
| 5,339,210 | A * | 8/1994 | Howell | 361/9 |
| 7,542,250 | B2 * | 6/2009 | Premerlani et al. | 361/2 |
| 2008/0310058 | A1 | 12/2008 | Premerlani et al. | |
| 2008/0315980 | A1 | 12/2008 | Premerlani et al. | |

OTHER PUBLICATIONS

Search Report and Written Opinion from corresponding EP Application No. EP 11187315.4 dated Feb. 4, 2013.

* cited by examiner

*Primary Examiner* — Rexford Barnie
*Assistant Examiner* — Christopher Clark
(74) *Attorney, Agent, or Firm* — Cantor Colburn LLP

(57) ABSTRACT

A device for controlling an electrical current includes control circuitry, a micro electromechanical system (MEMS) switch in communication with the control circuitry, the MEMS switch responsive to the control circuitry to facilitate the interruption of an electrical current, a Hybrid Arcless Limiting Technology (HALT) arc suppression circuit disposed in electrical communication with the MEMS switch to receive a transfer of electrical energy from the MEMS switch in response to the MEMS switch changing state from closed to open, the HALT arc suppression circuit including a capacitive portion, and a variable resistance arranged in parallel electrical communication with the capacitive portion of the HALT arc suppression circuit, the variable resistance to dissipate a portion of the transferred electrical energy.

17 Claims, 9 Drawing Sheets

MEMS-BASED SWITCHING SYSTEMS

BACKGROUND OF THE INVENTION

The subject matter disclosed herein relates to switching systems. Particularly, example embodiments of the present invention are related to micro-electromechanical system (MEMS) based switching systems, including motor starters and current-interrupting devices.

BRIEF DESCRIPTION OF THE INVENTION

According to an example embodiment of the present invention, a device for controlling an electrical current may include control circuitry, a micro electromechanical system (MEMS) switch in communication with the control circuitry, the MEMS switch responsive to the control circuitry to facilitate the interruption of the electrical current, a Hybrid Arcless Limiting Technology (HALT) arc suppression circuit disposed in electrical communication with the MEMS switch configured to receive a transfer of electrical energy from the MEMS switch in response to the MEMS switch changing state from closed to open, the HALT arc suppression circuit including a capacitive portion, and a variable resistance arranged in parallel electrical communication with the capacitive portion of the HALT arc suppression circuit.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Example embodiments of the present invention present innovations which significantly reduce the complexity, cost, and size of micro electromechanical system (MEMS) based motor starters and current-interrupting devices while providing efficient absorption of energy under fault conditions. The use of MEMS switches provide fast response time, thereby facilitating reduction in the let-through energy of an interrupted fault. A Hybrid Arcless Limiting Technology (HALT) circuit connected in parallel with the MEMS switches provides capability for the MEMS switches to be opened without arcing at any given time regardless of current or voltage, and the inclusion of metal-oxide varistors (MOV) in novel configurations provides for relatively efficient energy absorption under fault conditions.

Figure 1:
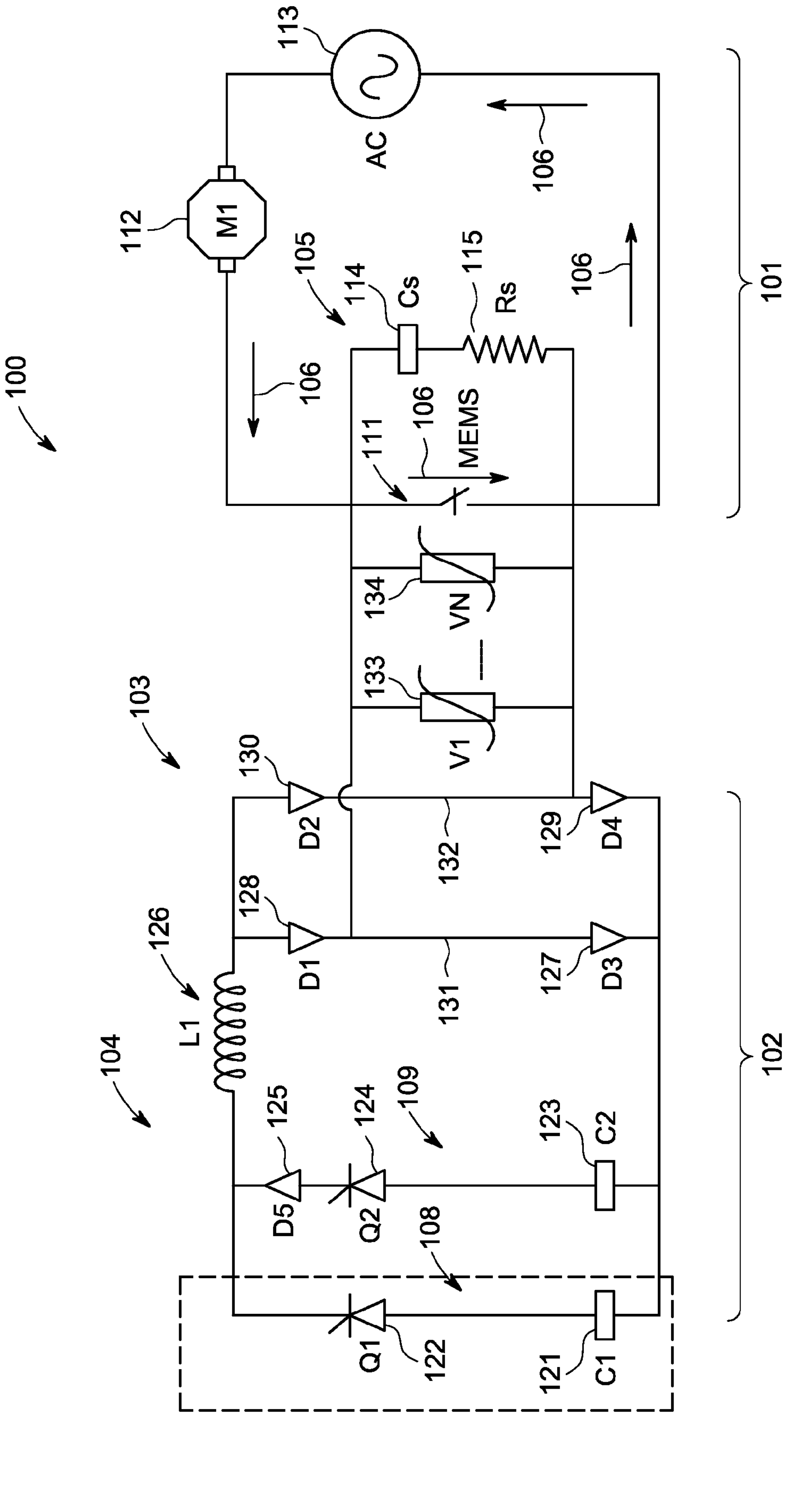
FIG. 1 depicts an exemplary arc-less micro-electromechanical system switch (MEMS) based switching system, according to an example embodiment.

FIG. 1 illustrates an exemplary arc-less micro-electromechanical system switch (MEMS) based switching system 100, according to an example embodiment. Presently, MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in a relatively short amount of time be available via nanotechnology-based devices, for example, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

For example, according to some example embodiments, MEMS switching devices may include cantilever beam structures. The cantilever beam structures are electrostatically operated via a gate control voltage. Current flows through the cantilever from a drain terminal to a source terminal. MEMS switching devices in general are distinguished from transistors and other switches by their mechanical/moving parts and small size. A plurality of other types of MEMS switches may be applicable to example embodiments; for example, suitable devices should include contacts/switches small enough that they can not dissipate energy through contact arcing (e.g., as a typical relay/electromechanical switch would). These MEMS devices are distinguished from small mechanical switches by (1) the size scales of the structure (beams are 50-100 um in length/width & the contact gaps are on the order of 1 um) & (2) they are electrostatically controlled (i.e., versus electromagnetic control).

As illustrated in FIG. 1, the arc-less MEMS based switching system 100 is shown as including MEMS based switching circuitry 101 and arc suppression circuitry 102, where the arc suppression circuitry 102 may consist or include Pulse assisted turn ON (PATO) circuitry and a Hybrid Arcless Limiting Technology (HALT) circuit, which is operatively coupled to the MEMS based switching circuitry 101. In certain embodiments, the MEMS based switching circuitry 101 may be integrated in its entirety with the arc suppression circuitry 102 in a single package, for example. In other embodiments, only certain portions or components of the MEMS based switching circuitry 101 may be integrated with the arc suppression circuitry 102.

The MEMS based switching circuitry 101 may include one or more MEMS switches 111. Additionally, the arc suppression circuitry 102 may include a balanced diode bridge 103 and a pulse circuit 104. Further, the arc suppression circuitry 102 may be configured to facilitate suppression of an arc formation between contacts of the one or more MEMS switches 111 by receiving a transfer of electrical energy from the MEMS switches in response to the MEMS switches changing state from closed to open. It may be noted that the arc suppression circuitry 102 may be configured to facilitate suppression of an arc formation in response to an alternating current (AC) 113 or a direct current (DC; not illustrated for clarity).

In the illustrated example embodiment, MEMS switch 111 is depicted as being a simple switch with two contacts, but it should be understood that MEMS switch 111 is a switch including at least three contacts. For example, although not illustrated, the MEMS switch 111 may include a first contact configured as a drain, a second contact configured as a source, and a third contact configured as a gate. Furthermore, as illustrated in FIG. 1, a voltage snubber circuit 105 may be coupled in parallel with the MEMS switch 111 and configured to limit voltage overshoot during fast contact separation as will be explained in greater detail hereinafter.

In certain example embodiments, the snubber circuit 105 may include a snubber capacitor 114 coupled in series with a snubber resistor 115. The snubber capacitor 114 may facilitate improvement in transient voltage sharing during the sequencing of the opening of the MEMS switch 111. Furthermore, the snubber resistor 115 may suppress any pulse of current generated by the snubber capacitor 114 during closing operation of the MEMS switch 111. In certain other example embodiments, the voltage snubber circuit 114 may include a metal oxide varistor (MOV) (not shown here; see 516, FIG. 5).

In accordance with further aspects of the present technique, a load 112 may be coupled in series with the MEMS switch 111 and a voltage source 113. In addition, the load 112 may also include a load inductance and a load resistance, where the load inductance is representative of a combined load inductance and a bus inductance viewed by the MEMS switch 111. Reference numeral 106 is representative of a load current that may flow through the load 112 and the MEMS switch 111.

Further, as noted with reference to FIG. 1, the arc suppression circuitry 102 may include a balanced diode bridge 103. In the illustrated example embodiment, a balanced diode bridge 103 is depicted as having a first branch 131 and a second branch 132. As used herein, the term "balanced diode bridge" is used to represent a diode bridge that is configured such that voltage drops across both the first and second branches 131 and 132 are substantially equal. The first branch 131 of the balanced diode bridge 103 may include a first diode D1 128 and a second diode D3 127 coupled together to form a first series circuit. In a similar fashion, the second branch 132 of the balanced diode bridge 103 may include a third diode D2 130 and a fourth diode D4 129 operatively coupled together to form a second series circuit.

In one embodiment, the MEMS switch 111 may be coupled in parallel across midpoints of the balanced diode bridge 103. The midpoints of the balanced diode bridge may include a first midpoint located between the first and second diodes 128, 127 and a second midpoint located between the third and fourth diodes 130, 129. Furthermore, the MEMS switch 111 and the balanced diode bridge 103 may be tightly packaged to facilitate minimization of parasitic inductance caused by the balanced diode bridge 103 and in particular, the connections to the MEMS switch 111. It may be noted that, in accordance with exemplary aspects of the present technique, the MEMS switch 111 and the balanced diode bridge 103 are positioned relative to one another such that the inherent inductance between the first MEMS switch 111 and the balanced diode bridge 111 produces a di/dt voltage less than a few percent of the voltage across the drain and source of the MEMS switch 111 when carrying a transfer of the load current to the diode bridge 103 during a MEMS switch 111 turn-off which will be described in greater detail hereinafter.

In one embodiment, the MEMS switch 111 may be integrated with the balanced diode bridge 103 in a single package or optionally, the same die with the intention of minimizing the inductance interconnecting the MEMS switch 111 and the diode bridge 103.

Additionally, the arc suppression circuitry 104 may include a pulse circuit 102 coupled in parallel electrical communication with the balanced diode bridge 103. The pulse circuit 102 may be configured to detect a switch condition and initiate opening of the MEMS switch 111 responsive to the switch condition. As used herein, the term "switch condition" refers to a condition that triggers changing a present operating state of the MEMS switch 111. For example, the switch condition may result in changing a first closed state of the MEMS switch 111 to a second open state or a first open state of the MEMS switch 111 to a second closed state. A switch condition may occur in response to a number of actions including but not limited to a circuit fault or switch ON/OFF request.

The pulse circuit 102 may include a pulse switch 124 and a pulse capacitor 123 series coupled to the pulse switch 124. Further, the pulse circuit may also include a pulse inductance 126 and a first diode 125 coupled in series with the pulse switch 124. The pulse inductance 126, the diode 125, the pulse switch 124 and the pulse capacitor 123 may be coupled in series to form the pulse circuit 102, where the said components may be configured to facilitate pulse current shaping and timing.

Additionally, Arc suppression circuitry 104 may include Hybrid Arcless Limiting Technology (HALT) specific circuitry 108. The circuitry 108 may include a HALT capacitance 121 (i.e., capacitive portion or capacitor) and a HALT switch 122. The HALT capacitance 121 and the HALT switch 122 may be coupled in series to form the HALT-specific circuitry 108. It is noted that although FIG. 1 illustrates the Pulse inductance 126 in series with the HALT-specific circuitry 108, example embodiments are not so limited. For example, a separate HALT inductance may be coupled in series with the HALT capacitance 121 and switch 122, and the entire HALT-specific circuitry 108 may further be coupled in parallel across the pulse inductance 126 and pulse capacitance 123.

In accordance with aspects of the present invention, the MEMS switch 111 may be rapidly switched (for example, on the order of picoseconds or nanoseconds) from a first closed state to a second open state while carrying a current albeit at a near-zero voltage. This may be achieved through the combined operation of the load circuit 112, and pulse circuit 102 including the balanced diode bridge 103 coupled in parallel across contacts of the MEMS switch 111.

Figure 2:
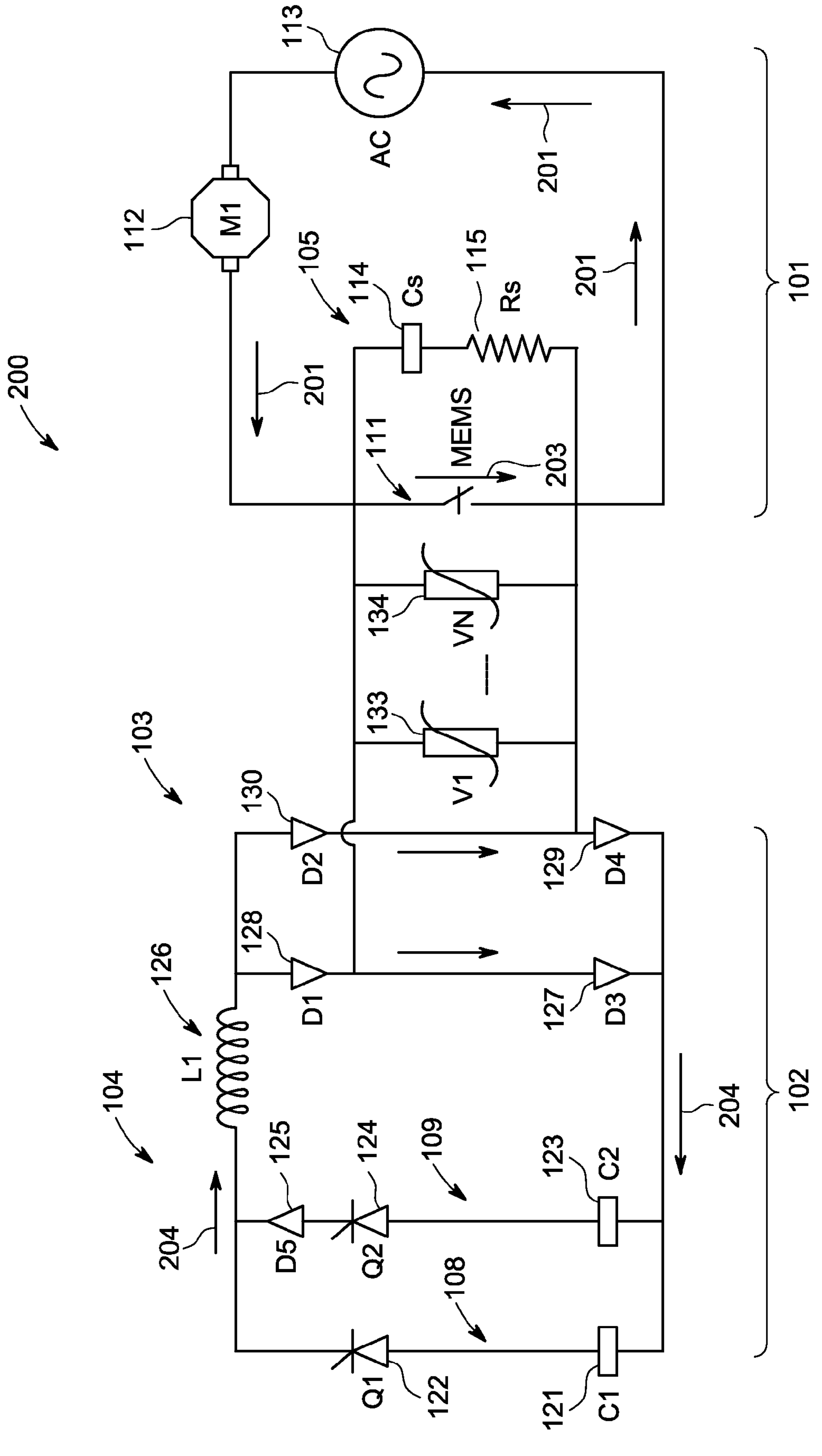
FIG. 2 depicts an exemplary arc-less micro-electromechanical system switch (MEMS) based switching system under a fault condition, according to an example embodiment.

As further illustrated, the system 100 may include a variable resistance bank comprising a plurality of variable resistors 133, 134 couple in parallel electrical communication with the MEMS based switching circuitry 101. The variable resistors 133, 134 may be any suitable variable resistors, including but not limited to Metal-Oxide varistors (MOV). The variable resistors 133, 134 may be rated and configured to absorb electrical energy transferred directly from the MEMS based switching circuitry 101 in the event of a fault. For example, a MEMS based switching system 200 under a fault condition is illustrated in FIG. 2.

As illustrated, the system 200 is substantially similar to the system 100. Therefore, exhaustive description of the arrangement and operation of each component is omitted herein for the sake of brevity.

As illustrated, the system 200 is under a fault condition where fault current 201 is transferred to the variable resistors 133-134 and a fault current 203 flows across contacts of the MEMS switch 111. In response to this fault, HALT-specific circuitry 108 may be initiated through activation of HALT switch 122 to aid in clearing the fault and initiating a HALT current 204. This is illustrated in FIG. 3.

Figure 3:
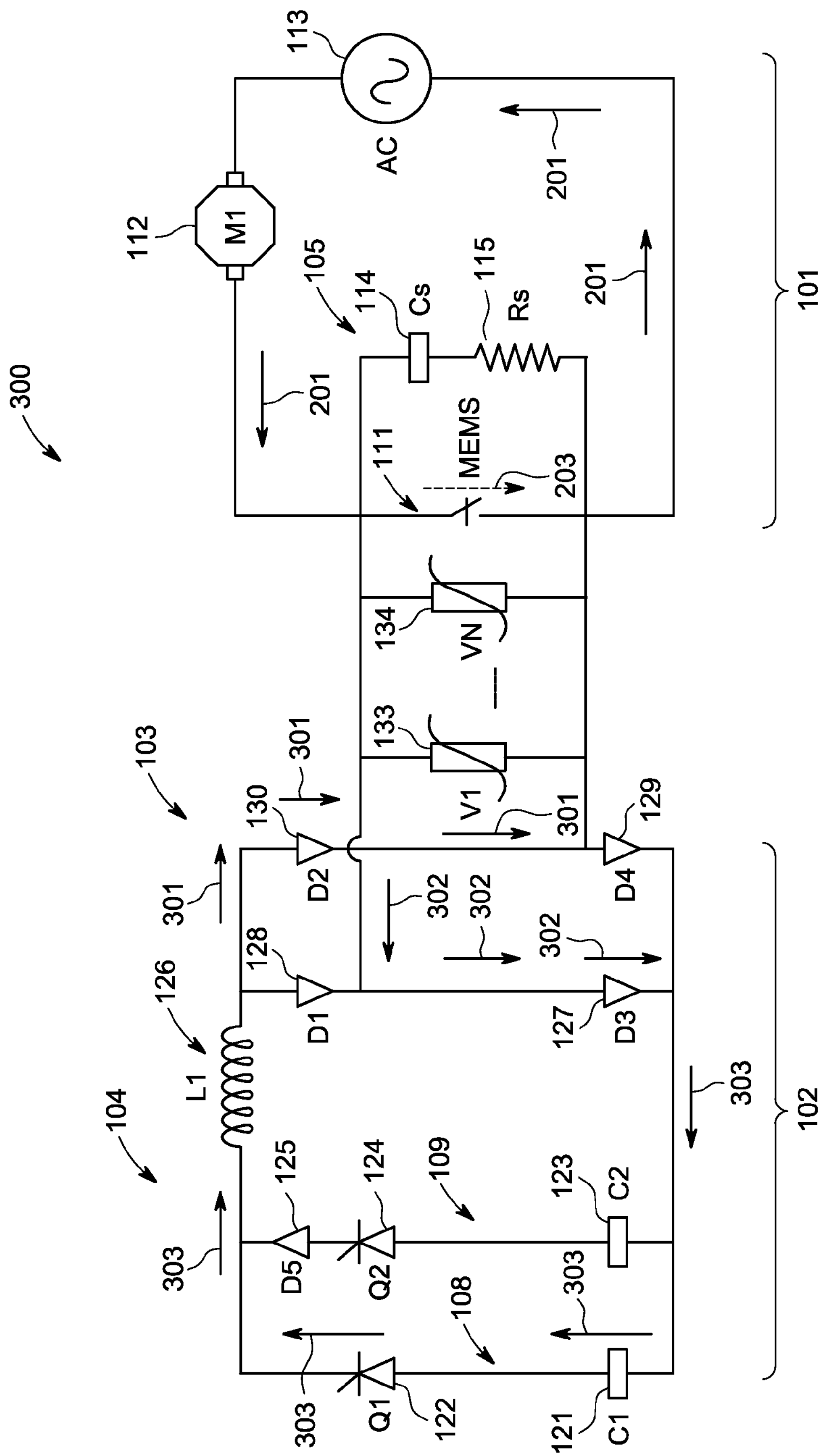
FIG. 3 depicts an exemplary arc-less micro-electromechanical system switch (MEMS) based switching system under a fault condition, according to an example embodiment.

As illustrated, the system 300 of FIG. 3 is substantially similar to the system 100. Therefore, exhaustive description of the arrangement and operation of each component is omitted herein for the sake of brevity.

As described above, the HALT switch 122 has been activated thereby transferring electrical energy from the MEMS based switching circuitry 101 to the HALT specific circuitry 108 as illustrated with currents 301-303. Upon electrical energy transfer, the fault is cleared by opening the MEMS switch 111, which is illustrated in FIG. 4.

Figure 4:
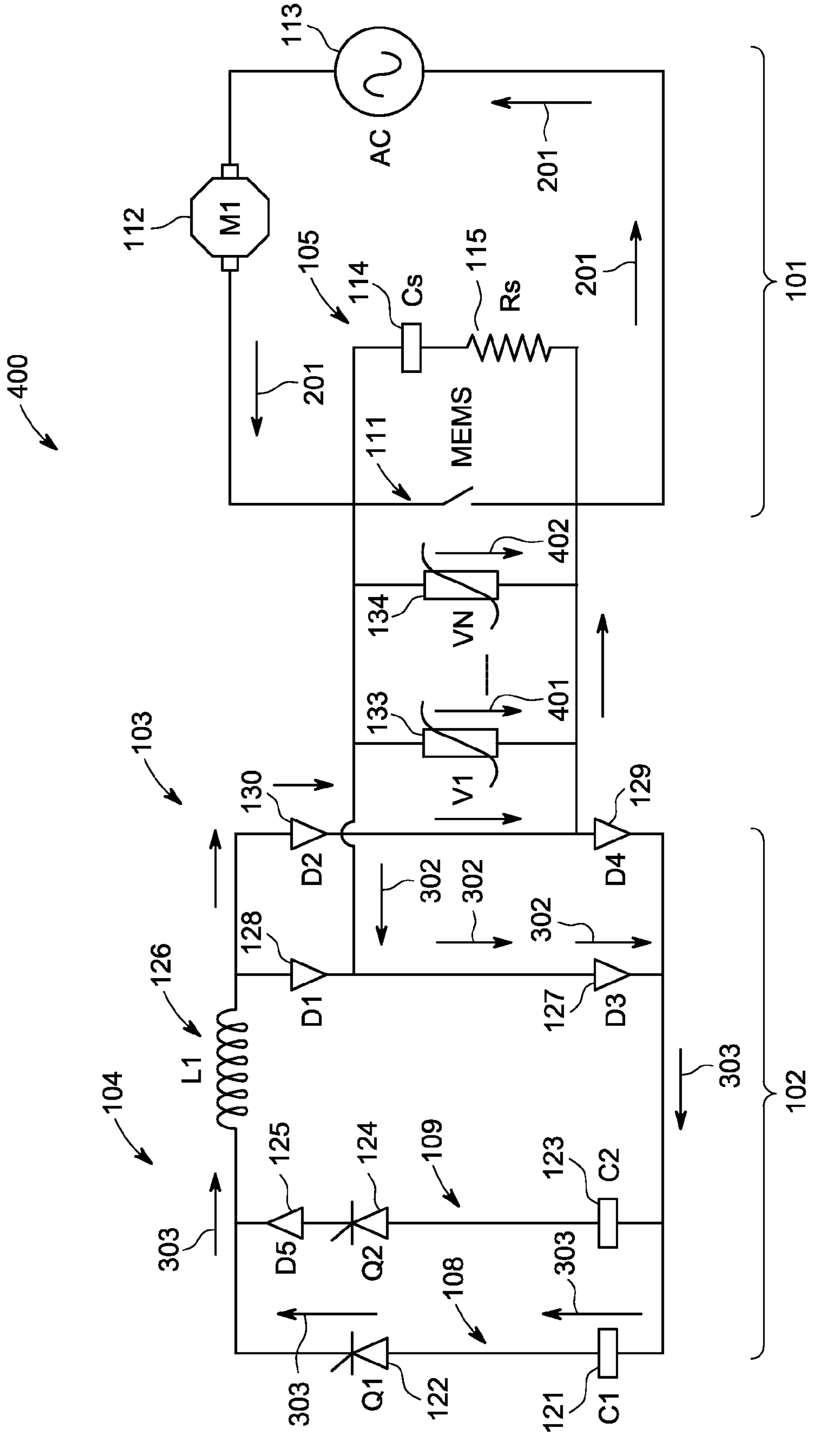
FIG. 4 depicts an exemplary arc-less micro-electromechanical system switch (MEMS) based switching system under a fault condition, according to an example embodiment.

As illustrated, the system 400 of FIG. 4 is substantially similar to the system 100. Therefore, exhaustive description of the arrangement and operation of each component is omitted herein for the sake of brevity.

As described above, the MEMS switch 111 is opened, thereby clearing the fault and allowing electrical energy to be absorbed through the snubber circuitry 105 and the varistors 133, 134 as illustrated with currents 401-402.

Figure 5:
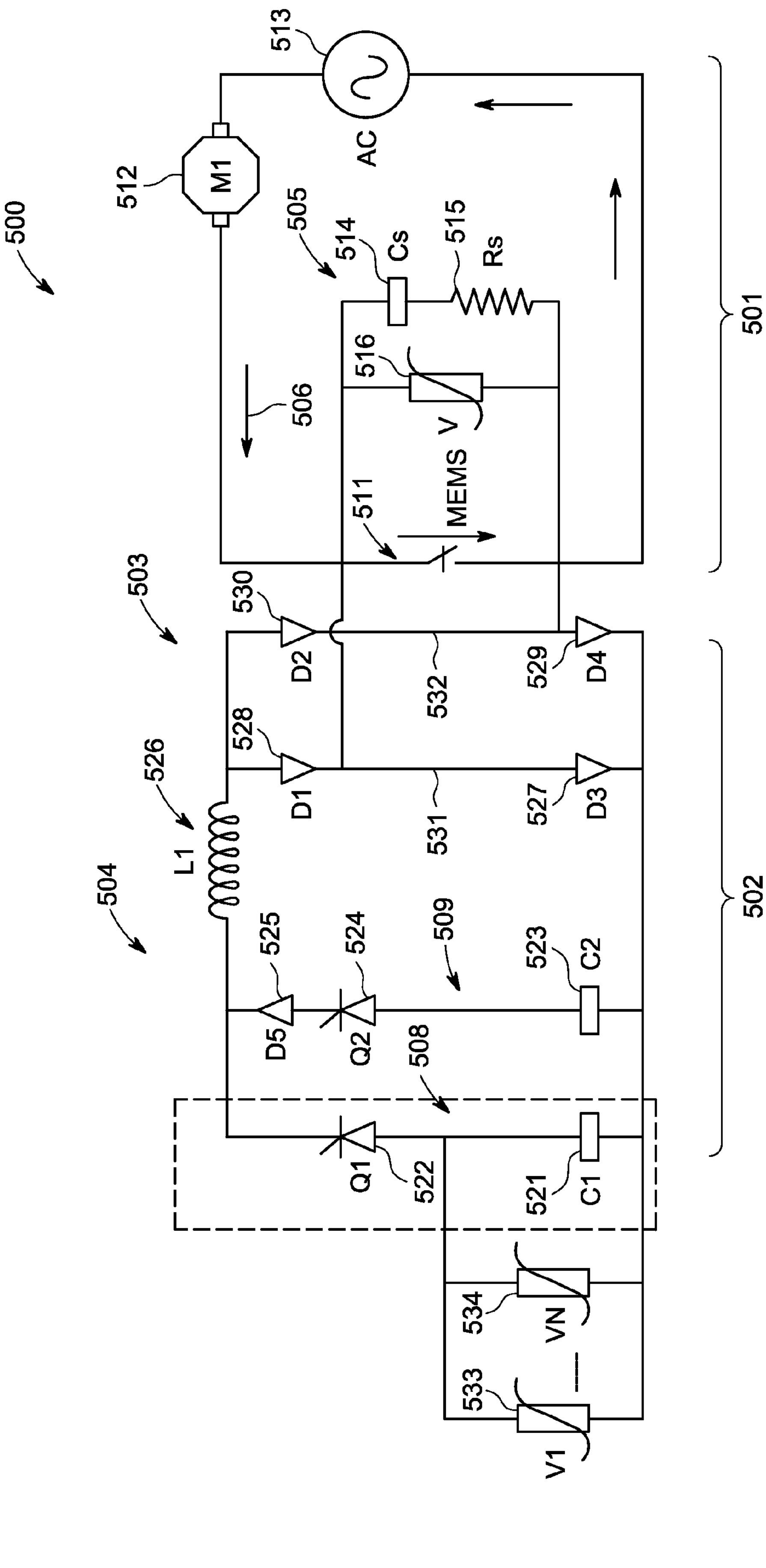
FIG. 5 depicts an exemplary arc-less micro-electromechanical system switch (MEMS) based switching system, according to an example embodiment.

Reference is now made to FIG. 5, where an alternative MEMS based switching system 500 is illustrated.

As illustrated in FIG. 5, the arc-less MEMS based switching system 500 is shown as including MEMS based switching circuitry 501 and arc suppression circuitry 502, where the arc suppression circuitry 502 may consist or include Pulse assisted turn ON (PATO) circuitry and a Hybrid Arcless Limiting Technology (HALT) circuit, which is operatively coupled to the MEMS based switching circuitry 501. As described with reference to system 100, in certain embodiments, the MEMS based switching circuitry 501 may be integrated in its entirety with the arc suppression circuitry 502 in a single package, for example. In other embodiments, only certain portions or components of the MEMS based switching circuitry 501 may be integrated with the arc suppression circuitry 502.

The MEMS based switching circuitry 501 may include one or more MEMS switches 511. Additionally, the arc suppression circuitry 502 may include a balanced diode bridge 503 and a pulse circuit 504. Further, the arc suppression circuitry 502 may be configured to facilitate suppression of an arc formation between contacts of the one or more MEMS switches 511 by receiving a transfer of electrical energy from the MEMS switches in response to the MEMS switches changing state from closed to open. It may be noted that the arc suppression circuitry 502 may be configured to facilitate suppression of an arc formation in response to an alternating current (AC) 513 or a direct current (DC; not illustrated for clarity).

In the illustrated example embodiment, MEMS switch 511 is depicted as being a simple switch with two contacts, but it should be understood that MEMS switch 511 is a switch including at least three contacts. For example, although not illustrated, the MEMS switch 511 may include a first contact configured as a drain, a second contact configured as a source, and a third contact configured as a gate. Furthermore, as illustrated in FIG. 5, a voltage snubber circuit 505 may be coupled in parallel with the MEMS switch 511 and configured to limit voltage overshoot during fast contact separation as will be explained in greater detail hereinafter.

In certain example embodiments, the snubber circuit 505 may include a snubber capacitor 514 coupled in series with a snubber resistor 515. The snubber capacitor 514 may facilitate improvement in transient voltage sharing during the sequencing of the opening of the MEMS switch 511. Furthermore, the snubber resistor 515 may suppress any pulse of current generated by the snubber capacitor 514 during closing operation of the MEMS switch 151. As further illustrated, the voltage snubber circuit 505 may include a metal oxide varistor (MOV) 516.

In accordance with further aspects of the present technique, a load 512 may be coupled in series with the MEMS switch 511 and a voltage source 513. In addition, the load 512 may also include a load inductance and a load resistance, where the load inductance is representative of a combined load inductance and a bus inductance viewed by the MEMS switch 511. Reference numeral 506 is representative of a load current that may flow through the load 512 and the MEMS switch 511.

Further, as noted with reference to FIG. 5, the arc suppression circuitry 502 may include a balanced diode bridge 503. In the illustrated example embodiment, a balanced diode bridge 503 is depicted as having a first branch 531 and a second branch 532. As used herein, the term "balanced diode bridge" is used to represent a diode bridge that is configured such that voltage drops across both the first and second branches 531 and 532 are substantially equal. The first branch 531 of the balanced diode bridge 503 may include a first diode D1 528 and a second diode D3 527 coupled together to form a first series circuit. In a similar fashion, the second branch 532 of the balanced diode bridge 503 may include a third diode D2 530 and a fourth diode D4 529 operatively coupled together to form a second series circuit.

In one embodiment, the MEMS switch 511 may be coupled in parallel across midpoints of the balanced diode bridge 503. The midpoints of the balanced diode bridge may include a first midpoint located between the first and second diodes 528, 527 and a second midpoint located between the third and fourth diodes 530, 529. Furthermore, the MEMS switch 511 and the balanced diode bridge 503 may be tightly packaged to facilitate minimization of parasitic inductance caused by the balanced diode bridge 503 and in particular, the connections to the MEMS switch 511. It may be noted that, in accordance with exemplary aspects of the present technique, the MEMS switch 511 and the balanced diode bridge 503 are positioned relative to one another such that the inherent inductance between the first MEMS switch 511 and the balanced diode bridge 511 produces a di/dt voltage less than a few percent of the voltage across the drain and source of the MEMS switch 511 when carrying a transfer of the load current to the diode bridge 503 during a MEMS switch 511 turn-off which will be described in greater detail hereinafter.

In one embodiment, the MEMS switch 511 may be integrated with the balanced diode bridge 503 in a single package or optionally, the same die with the intention of minimizing the inductance interconnecting the MEMS switch 511 and the diode bridge 503.

Additionally, the arc suppression circuitry 504 may include a pulse circuit 502 coupled in parallel electrical communication with the balanced diode bridge 503. The pulse circuit 502 may be configured to detect a switch condition and initiate opening of the MEMS switch 511 responsive to the switch condition. As used herein, the term "switch condition" refers to a condition that triggers changing a present operating state of the MEMS switch 511. For example, the switch condition may result in changing a first closed state of the MEMS switch 511 to a second open state or a first open state of the MEMS switch 511 to a second closed state. A switch condition may occur in response to a number of actions including but not limited to a circuit fault or switch ON/OFF request.

The pulse circuit 502 may include a pulse switch 524 and a pulse capacitor 523 series coupled to the pulse switch 524. Further, the pulse circuit may also include a pulse inductance 526 and a first diode 525 coupled in series with the pulse switch 524. The pulse inductance 526, the diode 525, the pulse switch 524 and the pulse capacitor 523 may be coupled in series to form the pulse circuit 502, where the said components may be configured to facilitate pulse current shaping and timing.

Additionally, Arc suppression circuitry 504 may include Hybrid Arcless Limiting Technology (HALT) specific circuitry 508. The circuitry 508 may include a HALT capacitance 521 (i.e., capacitive portion) and a HALT switch 522. The HALT capacitance 521 and the HALT switch 522 may be coupled in series to form the HALT-specific circuitry 508. It is noted that although FIG. 5 illustrates the Pulse inductance 526 in series with the HALT-specific circuitry 508, example embodiments are not so limited. For example, a separate HALT inductance may be coupled in series with the HALT capacitance 521 and switch 522, and the entire HALT-specific circuitry 508 may further be coupled in parallel across the pulse inductance 526 and pulse capacitance 523.

In accordance with aspects of the present invention, the MEMS switch 511 may be rapidly switched (for example, on the order of picoseconds or nanoseconds) from a first closed state to a second open state while carrying a current albeit at a near-zero voltage. This may be achieved through the combined operation of the load circuit 512, and pulse circuit 502 including the balanced diode bridge 503 coupled in parallel across contacts of the MEMS switch 511.

Figure 6:
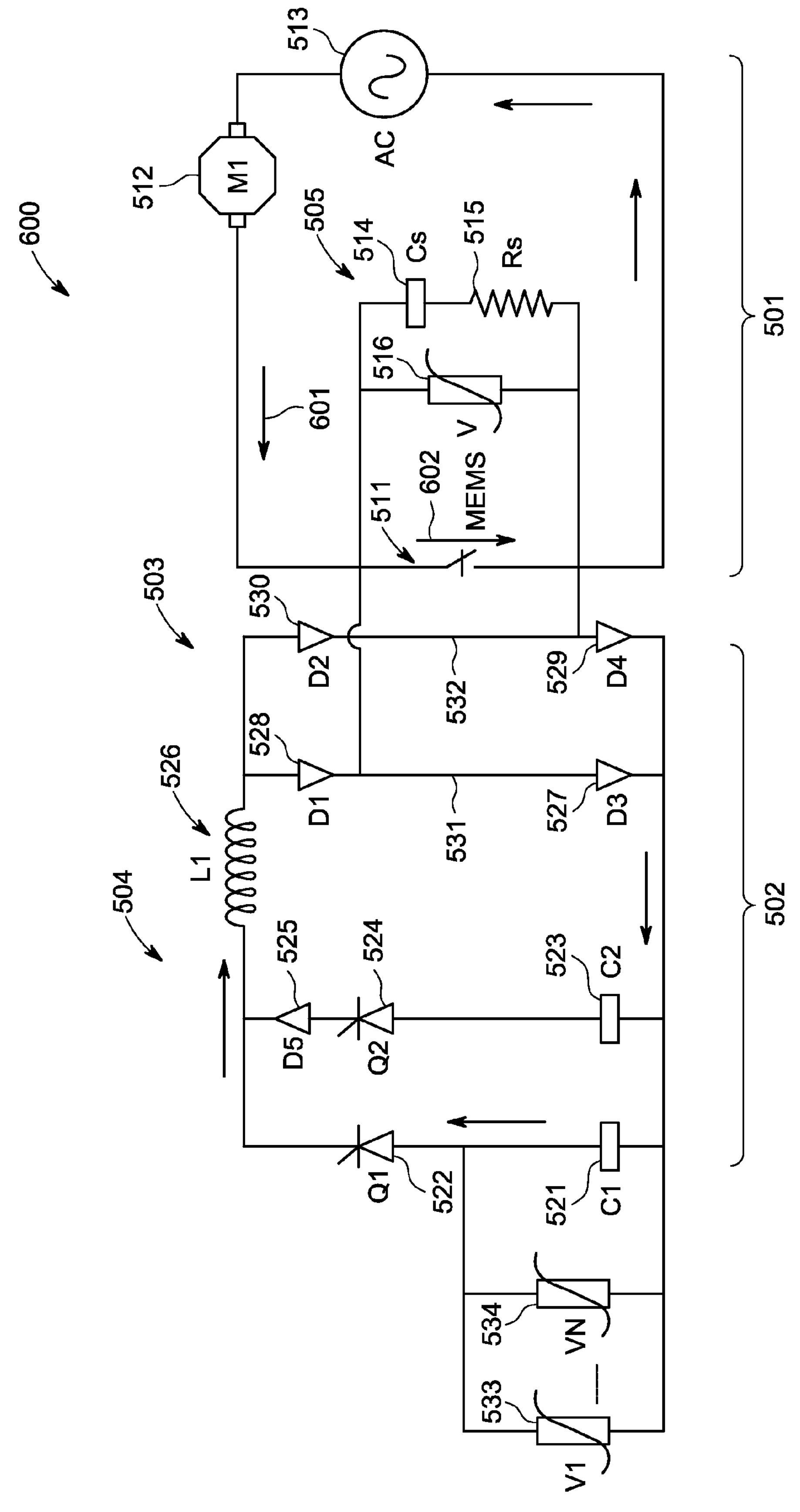
FIG. 6 depicts an exemplary arc-less micro-electromechanical system switch (MEMS) based switching system under a fault condition, according to an example embodiment.

As further illustrated, the system 500 may include a variable resistance bank comprising a plurality of variable resistors 533, 534 couple in parallel electrical communication with the HALT capacitance 521. The variable resistors 533, 534 may be any suitable variable resistors, including but not limited to Metal-Oxide varistors (MOV). The variable resistors 533, 534 may be rated and configured to absorb electrical energy transferred directly from the MEMS based switching circuitry 501 in the event of a fault once the HALT switch 522 is activated. For example, a MEMS based switching system 600 under a fault condition is illustrated in FIG. 6.

As illustrated, the system 600 is substantially similar to the system 500. Therefore, exhaustive description of the arrangement and operation of each component is omitted herein for the sake of brevity.

As illustrated, the system 600 is under a fault condition. Generally, if a system is under a fault condition, it may be desirable to clear a fault quickly or immediately. As current is high (or at least non-zero) a relatively large amount of energy may be trapped inside the motor 512. Thus, in response to this fault, HALT-specific circuitry 508 may be initiated through activation of HALT switch 522 to aid in clearing the fault. This is illustrated in FIG. 7.

Figure 7:
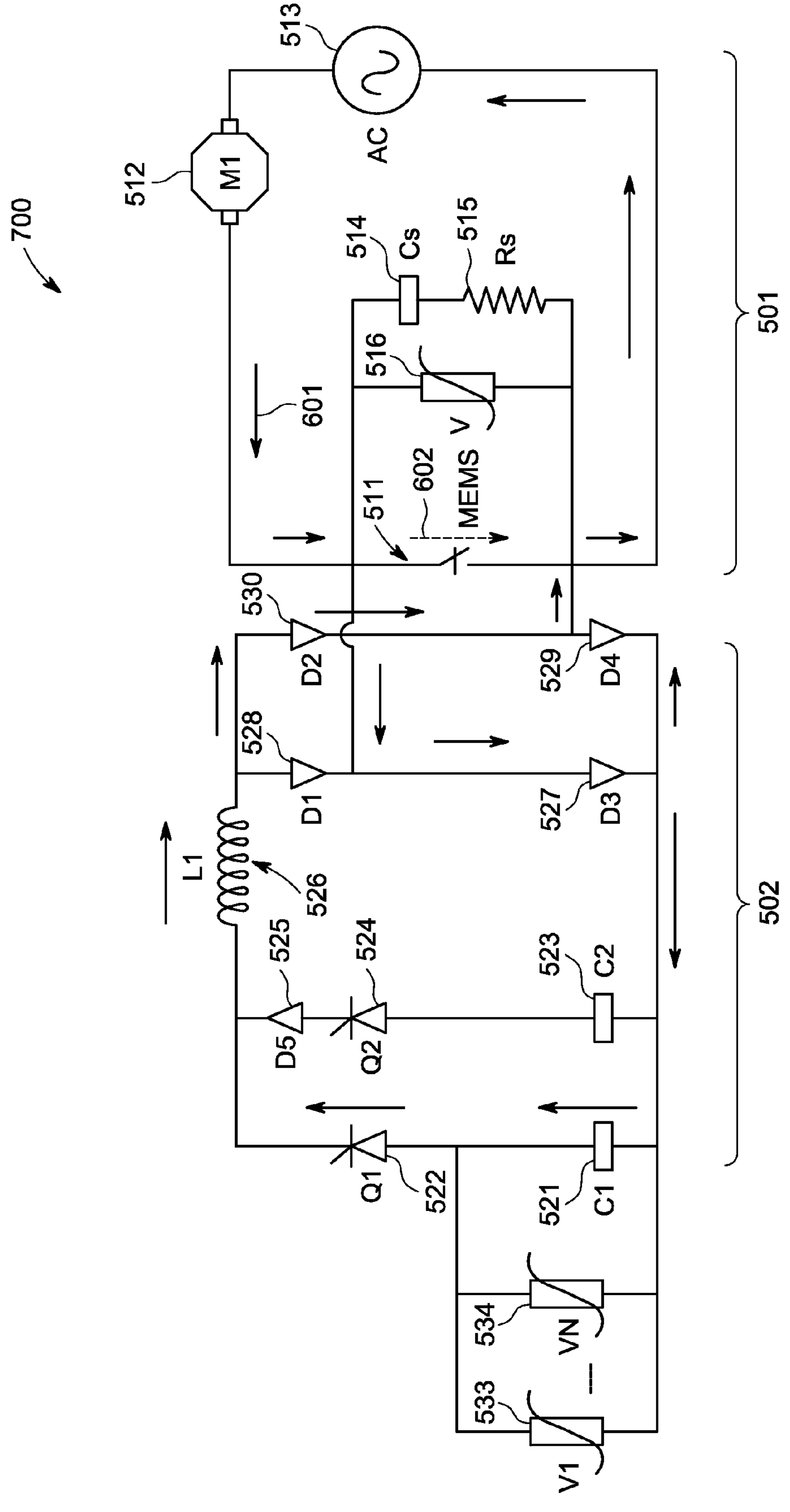
FIG. 7 depicts an exemplary arc-less micro-electromechanical system switch (MEMS) based switching system under a fault condition, according to an example embodiment.

As illustrated, the system 700 of FIG. 7 is substantially similar to the system 500. Therefore, exhaustive description of the arrangement and operation of each component is omitted herein for the sake of brevity.

As described above, the HALT switch 522 has been activated thereby transferring electrical energy from the MEMS based switching circuitry 501 to the HALT specific circuitry 508, where fault current 601 is transferred to the variable resistors 533-534, and a fault current 602 flows across contacts of the MEMS switch 511.

Figure 8:
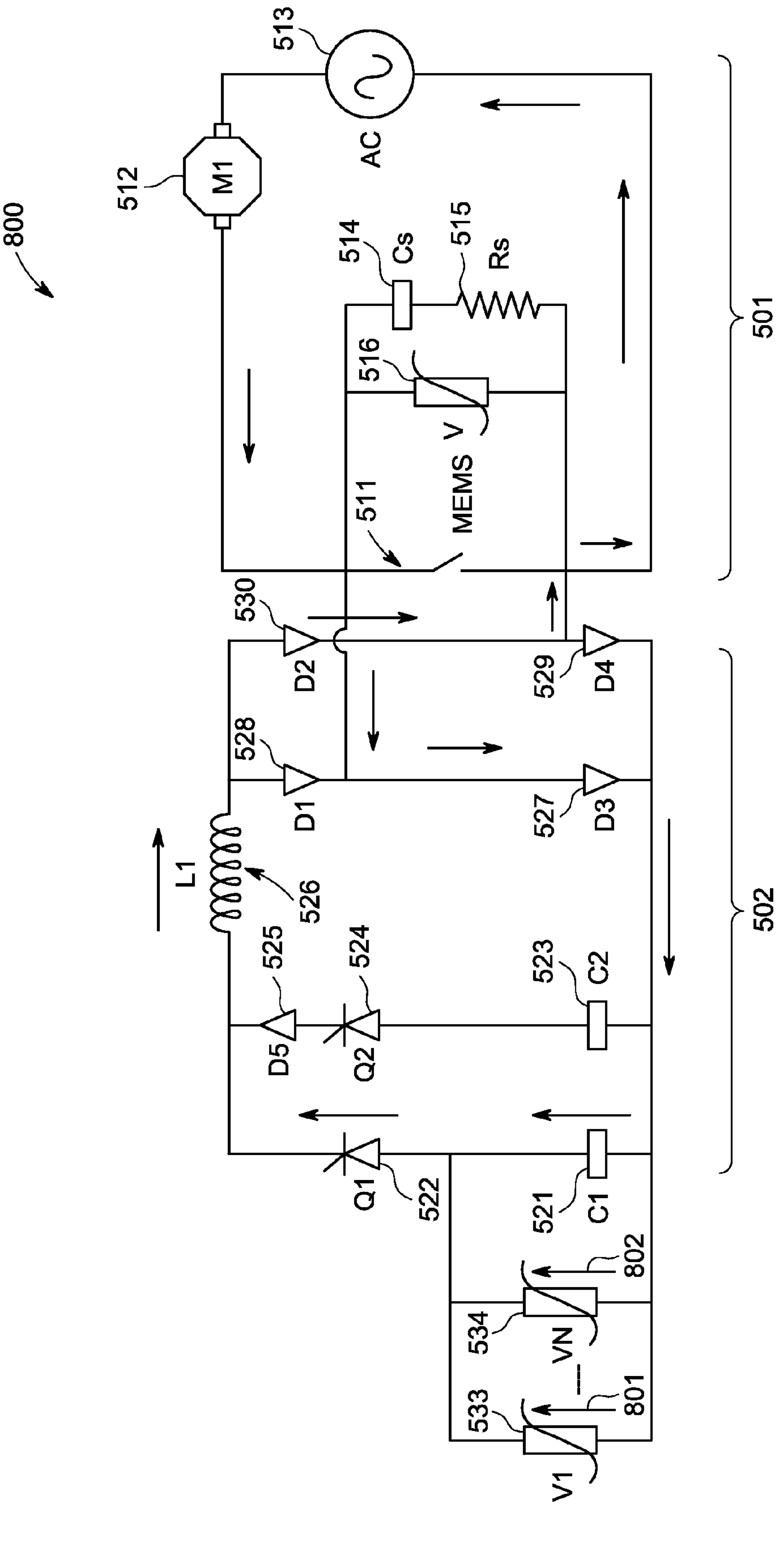
FIG. 8 depicts an exemplary arc-less micro-electromechanical system switch (MEMS) based switching system under a fault condition, according to an example embodiment.

Upon electrical energy transfer, the fault is cleared by opening the MEMS switch 511, which is illustrated in FIG. 8.

As illustrated, the system 800 of FIG. 8 is substantially similar to the system 500. Therefore, exhaustive description of the arrangement and operation of each component is omitted herein for the sake of brevity.

As described above, the MEMS switch 511 is opened, thereby clearing the fault and allowing electrical energy to be absorbed through the snubber circuitry 505 and the varistors 533, 534 as illustrated with currents 801-802.

As shown above, varistors 533, 534 absorb fault energy stored in an inductive load in response to a fault condition. As the varistors are in parallel communication with a capacitive portion 521 of the HALT circuitry 508, the varistors may be of a relatively smaller voltage rating when compared to the varistors 133, 134 due to the difference in applied voltage. Further, because of the relatively smaller voltage seen across the varistors 533, 534 during a protective energy transfer operation, a relatively smaller voltage appears across the diode bridge 503, the MEMS switch 511, the HALT switch 522, and the PATO switch 524. Due to this smaller voltage during the protective energy transfer operation, the diode bridge 503, the MEMS switch 511, the HALT switch 522, and the PATO switch 524 may be rated for a relatively lower voltage, resulting in smaller practicable size and cost.

Figure 9:
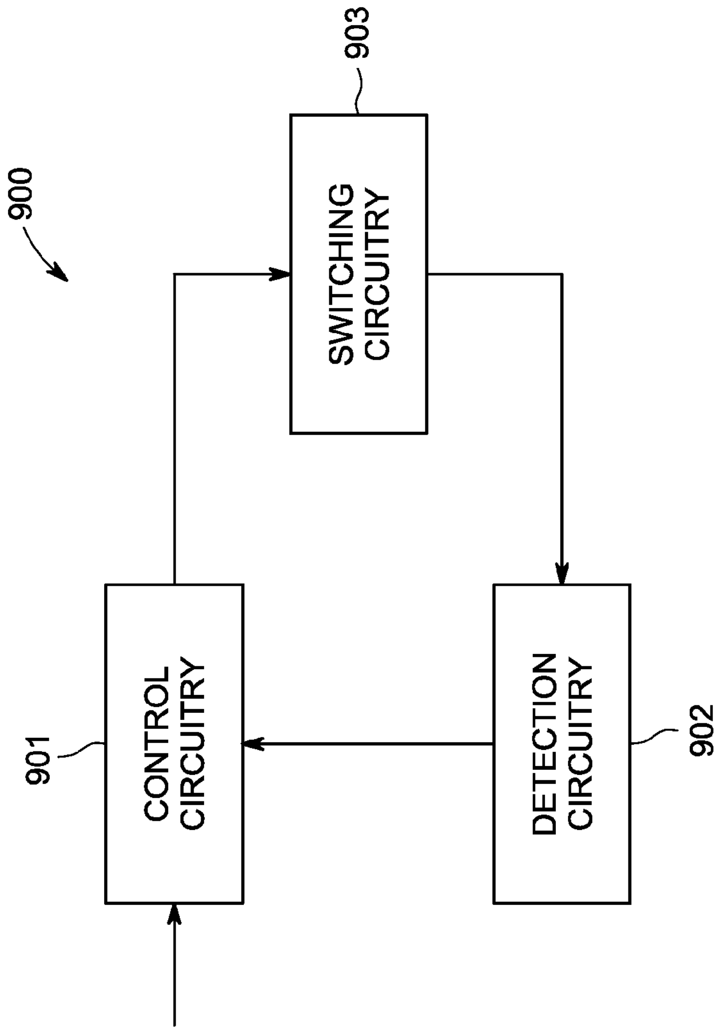
FIG. 9 depicts an exemplary arc-less micro-electromechanical system switch (MEMS) based switching system, according to an example embodiment.

Reference is now made to FIG. 9, which illustrates a block diagram of an exemplary soft switching system 900, in accordance with aspects of the present invention. As illustrated in FIG. 9, the soft switching system 900 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current. In one embodiment, the control circuitry 72 may be configured to facilitate arc-less switching of one or more MEMS switches comprising at least part of the switching circuitry 12.

In accordance with one aspect of the invention, the soft switching system 900 may be configured to perform soft or point-on-wave (PoW) switching whereby one or more MEMS switches in the switching circuitry 903 may be closed at a time when the voltage across the switching circuitry 903 is at or very close to zero, and opened at a time when the current through the switching circuitry 903 is at or close to zero. By closing the switches at a time when the voltage across the switching circuitry 903 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 903 is at or close to zero, the soft switching system 900 can be designed so that the current in the last switch to open in the switching circuitry 903 falls within the design capability of the switch. As alluded to above and in accordance with one embodiment, the control circuitry 901 may be configured to synchronize the opening and closing of the one or more MEMS switches of the switching circuitry 903 with the occurrence of a zero crossing of an alternating source voltage or an alternating load circuit current, or in the event of a fault.

As described above, example embodiments of the present invention present innovations which significantly reduce the complexity, cost, and size of MEMS-based motor starters while providing efficient absorption of energy under fault conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device for controlling an electrical current, comprising:

control circuitry;

a micro electromechanical system (MEMS) switch in communication with the control circuitry, the MEMS switch responsive to the control circuitry to facilitate the interruption of the electrical current;

a Hybrid Arcless Limiting Technology (HALT) arc suppression circuit disposed in electrical communication with the MEMS switch configured to receive a transfer of electrical energy from the MEMS switch in response to the MEMS switch changing state from closed to open, the HALT arc suppression circuit including a HALT capacitor in series with a HALT switch; and a variable resistor arranged in parallel electrical communication with the HALT capacitor and in series with the HALT switch of the HALT arc suppression circuit.

2. The device of claim 1, wherein the control circuitry is responsive to the electrical current meeting a parameter of a defined trip event to open the MEMS switch.

3. The device of claim 2, wherein the parameter of the defined trip event comprises a fault event.

4. The device of claim 2, wherein the MEMS switch includes a single gate contact in signal communication with the control circuitry configured to open the MEMS switch subsequent to the defined trip event.

5. The device of claim 2, further comprising detection circuitry in signal communication with the control circuitry, the detection circuitry being configured to provide an indication of the defined trip event.

6. The device of claim 2, wherein the MEMS switch is configured for signal communication with a load.

7. The device of claim 6, wherein the load is a motor or an inductive load.

8. The device of claim 1, further comprising a voltage snubber circuit in parallel connection with the MEMS switch.

9. The device of claim 1, further comprising detection circuitry configured to synchronize a change in state of the MEMS switch with an occurrence of a zero crossing of at least one of an alternating electrical current and an alternating voltage relative to an absolute zero voltage reference.

10. The device of claim 1, wherein the MEMS switch is one of a plurality of MEMS switches corresponding to a single current path, each MEMS switch of the plurality of MEMS switches being responsive to the control circuitry to facilitate the interruption of an electrical current passing through the single current path.

11. The device of claim 10, wherein the plurality of MEMS switches are arranged in parallel.

12. The device of claim 10, wherein the plurality of MEMS switches are arranged in series.

13. The device of claim 1, wherein the variable resistor includes a bank of variable resistors.

14. The device of claim 13, wherein each of the variable resistors is a Metal Oxide Varistor (MOV).

15. The device of claim 13, wherein each of the variable resistors is arranged in parallel electrical communication with the HALT capacitor of the HALT arc suppression circuitry.

16. The device of claim 13, wherein the variable resistor is configured to dissipate the received energy based on a DC voltage peak of the HALT arc suppression circuitry.

17. The device of claim 1, wherein the variable resistor is configured to dissipate the received energy based on a DC voltage peak of the HALT arc suppression circuitry.

* * * * *

UNITED STATES PATENT AND TRADEMARK OFFICE

CERTIFICATE OF CORRECTION

PATENT NO. : 8,537,507 B2
APPLICATION NO. : 12/940027
DATED : September 17, 2013
INVENTOR(S) : Anand et al.

It is certified that error appears in the above-identified patent and that said Letters Patent is hereby corrected as shown below:

In the Specification

In Column 4, Line 9, delete "bridge 111" and insert -- bridge 103 --, therefor.

In Column 6, Line 58, delete "bridge 511" and insert -- bridge 503 --, therefor.

Signed and Sealed this
Thirty-first Day of December, 2013

Margaret A. Focarino

Margaret A. Focarino
*Commissioner for Patents of the United States Patent and Trademark Office*